(12) United States Patent
Melton et al.

(10) Patent No.: US 11,046,430 B1
(45) Date of Patent: Jun. 29, 2021

(54) INTELLIGENT TRAJECTORY ADVISER SYSTEM FOR UNMANNED AERIAL VEHICLES IN COMPLEX ENVIRONMENTS

(71) Applicant: United States of America as Represented by the Administrator of the NASA, Washington, DC (US)

(72) Inventors: John Earl Melton, Hollister, CA (US); Ben Edward Nikaido, Gilroy, CA (US)

(73) Assignee: United States of America as Represented by the Administrator of NASA, Washington, DC (US)

( * ) Notice: Subject to any disclaimer, the term of this patent is extended or adjusted under 35 U.S.C. 154(b) by 576 days.

(21) Appl. No.: 15/955,661

(22) Filed: Apr. 17, 2018

Related U.S. Application Data

(60) Provisional application No. 62/486,216, filed on Apr. 17, 2017, provisional application No. 62/487,283, filed on Apr. 19, 2017.

(51) Int. Cl.
*B64C 39/02* (2006.01)
*G05D 1/00* (2006.01)
(Continued)

(52) U.S. Cl.
CPC ............ *B64C 39/024* (2013.01); *G01S 17/89* (2013.01); *G05D 1/0088* (2013.01); *G05D 1/101* (2013.01);
(Continued)

(58) Field of Classification Search
CPC ...... G06N 3/0454; G06N 3/08; B64C 39/024; B64C 2201/141; G06T 7/70;
(Continued)

(56) References Cited

U.S. PATENT DOCUMENTS

| 8,649,632 B2 * | 2/2014 | Neophytou | ........ G06K 9/00637 382/285 |
| 9,618,934 B2 * | 4/2017 | Deroos | ................ G05D 1/0011 |

(Continued)

OTHER PUBLICATIONS

Courbon, J. et al. "Vision-based navigation of unmanned aerial vehicles"; Control Engineering Practice 18 (2010) pp. 789-799 (11 pages).

(Continued)

*Primary Examiner* — Joshua E Rodden
(74) *Attorney, Agent, or Firm* — Rhys W. Cheung; Robert M. Padilla; Helen M. Galus

(57) ABSTRACT

Systems and methods are provided for improving the flight safety of fixed- and rotary-wing unmanned aerial systems (UAS) operating in complex dynamic environments, including urban cityscapes. Sensors and computations are integrated to predict local winds and promote safe operations in dynamic urban regions where GNSS and other network communications may be unavailable. The system can be implemented onboard a UAS and does not require in-flight communication with external networks. Predictions of local winds (speed and direction) are created using inputs from sensors that scan the local environment. These predictions are then used by the UAS guidance, navigation, and control (GNC) system to determine safe trajectories for operations in urban environments.

19 Claims, 5 Drawing Sheets

(51) Int. Cl.
*G05D 1/10* (2006.01)
*G08G 5/00* (2006.01)
*G01S 17/89* (2020.01)
*G06N 3/04* (2006.01)
*G06N 3/08* (2006.01)
*H04N 7/18* (2006.01)
*G06T 7/70* (2017.01)

(52) U.S. Cl.
CPC ............ *G06N 3/0454* (2013.01); *G06N 3/08* (2013.01); *G06T 7/70* (2017.01); *G08G 5/0034* (2013.01); *G08G 5/0039* (2013.01); *G08G 5/0069* (2013.01); *G08G 5/0091* (2013.01); *H04N 7/185* (2013.01); *B64C 2201/141* (2013.01); *G06T 2207/10032* (2013.01); *G06T 2207/20081* (2013.01); *G06T 2207/20084* (2013.01)

(58) Field of Classification Search
CPC . G06T 2207/10032; G06T 2207/20081; G06T 2207/20084; G01S 17/89; G05D 1/0088; G05D 1/101; G08G 5/0039; G08G 5/0069; G08G 5/0091; H04N 7/185
USPC .......................................................... 701/10
See application file for complete search history.

(56) References Cited

U.S. PATENT DOCUMENTS

| | | | | |
|---|---|---|---|---|
| 10,217,207 | B2* | 2/2019 | Marra | B64C 39/024 |
| 10,618,673 | B2* | 4/2020 | Chan | G06T 7/246 |
| 2009/0037091 | A1* | 2/2009 | Bolt, Jr. | G08G 5/0034 |
| | | | | 701/10 |
| 2011/0295569 | A1* | 12/2011 | Hamke | G01P 5/00 |
| | | | | 703/2 |
| 2014/0046510 | A1* | 2/2014 | Randolph | G01P 13/045 |
| | | | | 701/14 |
| 2015/0347872 | A1* | 12/2015 | Taylor | G06T 7/11 |
| | | | | 382/224 |
| 2015/0379408 | A1* | 12/2015 | Kapoor | G01W 1/10 |
| | | | | 706/46 |
| 2017/0031369 | A1* | 2/2017 | Liu | G06K 9/0063 |
| 2017/0305546 | A1* | 10/2017 | Ni | G08G 5/0034 |
| 2018/0158197 | A1* | 6/2018 | Dasgupta | G06T 7/11 |
| 2019/0101934 | A1* | 4/2019 | Tuukkanen | G01C 21/20 |
| 2019/0147753 | A1* | 5/2019 | Hendrian | G08G 5/0039 |
| | | | | 701/14 |
| 2019/0204093 | A1* | 7/2019 | Cantrell | G05D 1/0088 |
| 2019/0271563 | A1* | 9/2019 | Pandit | G01C 21/20 |
| 2019/0346269 | A1* | 11/2019 | Mohr | G01C 21/165 |
| 2020/0103552 | A1* | 4/2020 | Phelan | G01S 13/95 |
| 2020/0130830 | A1* | 4/2020 | Dong | G05D 1/0016 |

OTHER PUBLICATIONS

Smolyanskiy, N. et al. "Toward Low-Flying Autonomous MAV Trail Navigation using Deep Neural Networks for Environmental Awareness"; arXiv:1705.02550v1; Jul. 2010 (7 pages).

Riisgaard, S. et al. "SLAM for Dummies: A Tutorial Approach to Simultaneous Localization and Mapping" (127 pages).

Duggal, V. et al. "Hierarchical Structured Learning for Indoor Autonomous Navigation of Quadcopter"; Proceedings of the Tenth Indian Conference on Computer Vision, Graphics and Image Processing; Dec. 18-22, 2016; Guwahati, India (8 pages).

Maturana, D. et al. "3D Convolutional Neural Networks for Landing Zone Detection from LiDAR"; 2015 IEEE International Conference on Robotics and Automation (ICRA); May 26-30, 2015; Seattle, Washington; pp. 3471-3478 (8 pages).

Loquercio, A. et al. "DroNet: Learning to Fly by Driving"; IEEE Robotics and Automation Letters; Jan. 2018 (8 pages).

* cited by examiner

INTELLIGENT TRAJECTORY ADVISER SYSTEM FOR UNMANNED AERIAL VEHICLES IN COMPLEX ENVIRONMENTS

CROSS-REFERENCE TO RELATED APPLICATIONS

This application claims the benefit of U.S. Provisional Application No. 62/486,216, filed Apr. 17, 2017, and U.S. Provisional Application No. 62/487,283, filed Apr. 19, 2017, both of which are herein incorporated by reference in their entireties.

ORIGIN OF THE INVENTION

The invention described herein was made by an employee of the United States Government and may be manufactured and used by or for the Government of the United States of America for governmental purposes without the payment of any royalties thereon or therefor.

FIELD OF THE INVENTION

The present embodiments relate to unmanned aerial systems, more particularly, to operating unmanned aerial systems without in-flight communication or external networks.

BACKGROUND OF THE INVENTION

Unmanned Aerial Systems (UAS) include fixed wing and rotary-wing unmanned aerial vehicles (UAV), commonly known as drones, in communication with a controller. Remote-controlled drones rely on an operator on the ground. Truly unmanned systems are controlled autonomously by onboard computers. Unmanned Aerial Systems are useful for purposes such as package delivery, mapping, surveying, and surveillance. However, a number of challenges are faced by current systems operating in complex environments, such as urban areas.

Position calculation typically uses navigation signals such as signals from global navigation satellite system (GNSS), WiFi, cellular, or other navigation signals from similar networks. However, there are a number of terrains where the signal from GNSS or other networks is weak, shadowed, unreliable, or unavailable, including areas such as canyons, mountainous areas, and urban canyons, i.e., the lower altitudes within urban cityscapes between buildings. Unavailable navigation signals hampers use of an UAS systems in urban environments. Prior approaches to overcoming position calculation include using dead reckoning to estimate position. However, such systems rely on both accurate inertial measurement systems and a known initial state. It would be desirable to have a UAS that overcomes the above challenges without the limitations of previous approaches.

SUMMARY OF THE INVENTION

It is a feature of illustrative embodiments of the present invention to provide a method and a system for an intelligent trajectory adviser system for unmanned aerial vehicles (UAVs) in complex environments. Finding location without the use of a GNSS and allowing a UAS to predict wind without having a real-time connection to navigation or wind data from an external source are desired for creating an accurate trajectory adviser system for a UAS. In view of the foregoing, it will be appreciated that providing such a system would be a significant advancement in the art.

Because of the difficulty of getting clear, reliable GNSS signals while traveling through complex environments, current UAS systems are incapable of aerial navigation through urban cityscapes while maintaining precise knowledge of their longitude, latitude, and altitude. Current approaches assume that robust connections will exist between the UAS and control stations, and that GNSS and other location services will be uninterrupted. However, as noted above, such communication is often unavailable within urban canyons and in other areas.

Winds hamper autonomous UAS navigation without external location services by disturbing the motion of the UAS, among other challenges. Urban environments are dynamic, and building locations and layouts can accelerate and decelerate winds, while also causing winds to come from non-intuitive directions. Furthermore, real-time data and exact knowledge of building sizes, shapes, and positions are often unavailable for real-time navigation. A system that allows the prediction of the routes that would involve dangerous winds would greatly add to the safety and operability of a UAS system within an urban environment, and could also be used for a variety of other purposes.

In some embodiments of the invention, the two main problems for UAS autonomy can be approached by using a machine-learning process, as well as use of machine training data obtained from scans of the area, such as wind field data or location data. These problems can be addressed by a method for providing real-time trajectory information, the method comprising (A) training a neural network with pre-existing landscape data along an intended flight route of the unmanned aerial system;

(B) uploading the neural network that is trained with the pre-existing landscape data to a computer onboard the unmanned aerial system;

(C) while being flown along the intended flight route: scanning a peripheral environment around the unmanned aerial system to produce imagery of the unmanned aerial system's current surroundings; determining actual positions of the unmanned aerial system using the scanned imagery, the neural network, and the pre-existing landscape data, wherein the actual positions are determined without the use of GNSS, cellular data, WiFi and other network communication external to the unmanned aerial system; and, correcting the position of the unmanned aerial system when the actual position is not along the intended flight route.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION OF THE INVENTION

Figure 1:
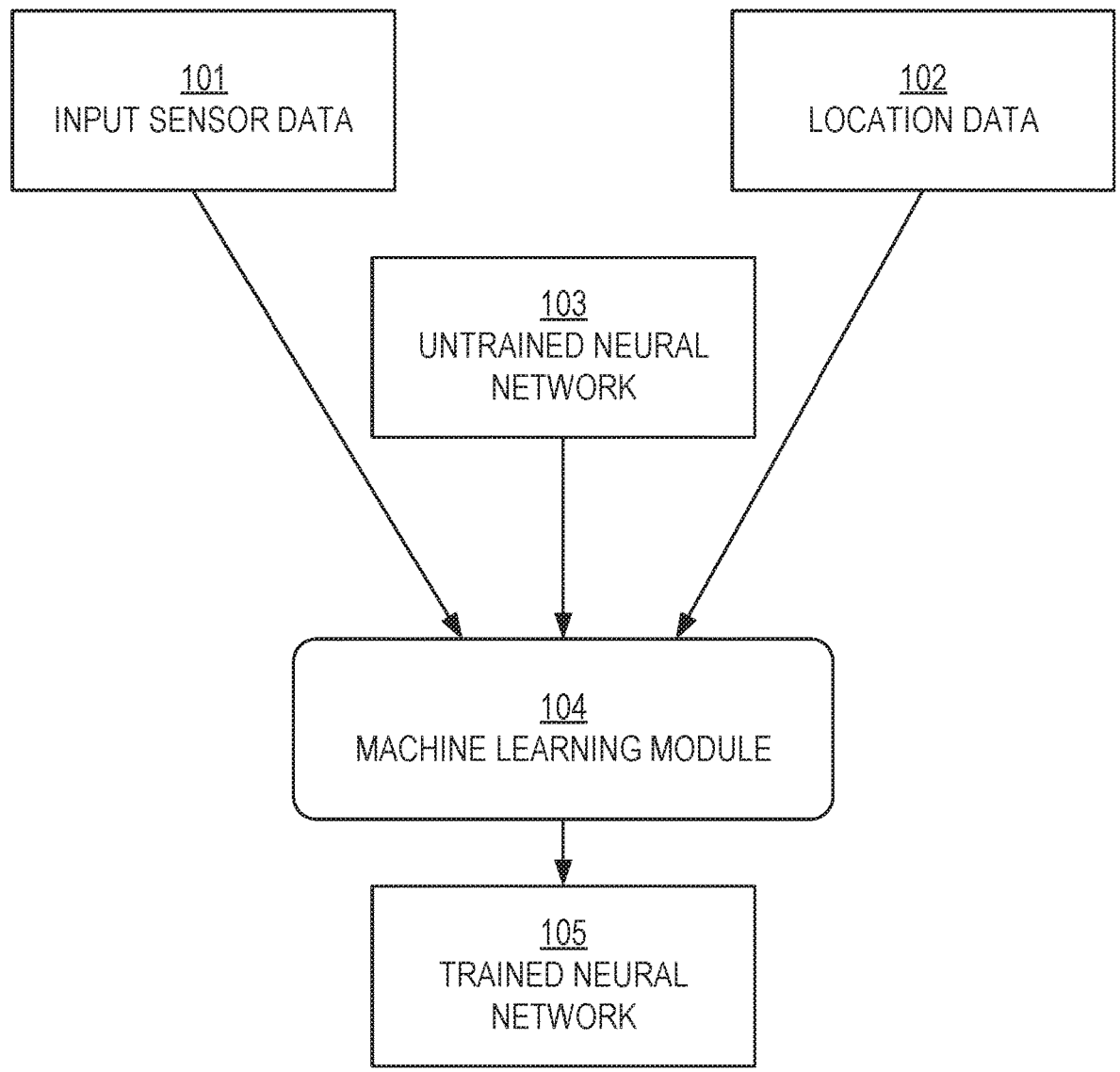
FIG. 1 is a schematic diagram that shows a system for training a neural network with sensor images and positions, according to some embodiments.

Before the present methods and systems for an intelligent trajectory adviser system for unmanned aerial vehicles (UAVs) in complex environments are disclosed and described, it is to be understood that this invention is not limited to the particular configurations, process steps, and materials disclosed herein, and as such, configurations, process steps, and materials may vary somewhat without departing from the scope and spirit of the invention. It is also to be understood that the terminology employed herein is used for the purpose of describing particular embodiments only and is not intended to be limiting since the scope of the present invention will be limited only by the appended claims and equivalents thereof. The publications and other reference materials referred to herein to describe the background of the invention and to provide additional detail regarding its practice are hereby incorporated by reference. The references discussed herein are provided solely for their disclosure prior to the filing date of the present application. Nothing herein is to be construed as an admission that the inventors are not entitled to distinguish the presently claimed inventions from such disclosures.

It must be noted that, as used in this specification and the appended claims, the singular forms "a," "an," and "the" include plural referents unless the context clearly dictates otherwise. Thus, for example, reference to "a sensor" includes configurations that involve multiple sensors, or multiple types of sensors (such as visual sensors, infrared, LIDAR, radar, sonar, etc.). Unless defined otherwise, all technical and scientific terms used herein have the same meanings as commonly understood by one of ordinary skill in the art.

In describing and claiming the present invention, the following terminology will be used in accordance with the definitions set out below.

As used herein, "comprising," "including," "containing," "characterized by," and grammatical equivalents thereof are inclusive or open-ended terms that do not exclude additional unrecited elements or method steps.

Providing GNSS-Free Navigation

The intelligent trajectory adviser system includes one or more neural networks loaded onto the computer of a UAS. These one or more neural networks are trained to operate and provide needed information to the UAS, such as location and wind field predictions. The information provided by these neural networks can be fed into an additional system that can use the data to calculate a safe and accurate trajectory for the UAS to follow in reaching its destination, even if GNSS or other external communication is unavailable or fails.

GNSS reception in an urban environment is often unavailable or inaccurate in urban canyons due to (1) restricted satellite view, shadowing, or multi-path reflections; and (2) unstable network communication, or limited or restricted bandwidth. Further, urban cityscape geometry is dynamic, imprecise, and complex. To overcome these challenges, it would be advantageous to have a system for determining location of a UAS that avoids the need for GNSS location determination. Embodiments of the present invention have this advantage.

Components of the system include onboard sensors that can scan the periphery of the UAS to produce imagery of the current surroundings; one or more machine learning algorithms, i.e., neural networks, that take the scan information and produce kinematics predictions, such as predictions of the position, velocity, acceleration, and orientation of the UAS; and computing hardware to perform the real-time kinematics calculations onboard the UAS.

At least one neural network on the UAS is dedicated to giving accurate information on location. To create an accurate trajectory adviser, it is important for the UAS to have accurate information on its location in order to reach its final destination. Previously, this information is provided by a GNSS system, or by other network connection with a dead reckoning component if the GNSS fails. Present embodiments train a neural network (NN), using sensor imagery of the environs and correlated positions captured during previous UAS flights or traverses of synthetic city/urban geometries. Illustrative sensors that may be used according to present embodiments include cameras and LIDAR sensors. In some illustrative embodiments, the sensors are LIDAR sensors, which capture a 360 degree view around the UAS with a 30 degree angle above and below the horizontal, but it will be appreciated that a number of sensor configurations can be used so long as the training input for the neural network can be adjusted to fit the appropriate sensor configuration.

FIG. 1 is a schematic diagram that shows a system for training a neural network with sensor images and positions, according to some embodiments. To provide accurate position information, input sensor images or data 101 are provided to a machine learning module 104 for training. Input sensor images or data 101 include scans that have been collected on a previous journey along the route or area in which the UAS is to operate, or the scans can be created through the use of an accurate synthetic representation of the urban landscape to be traversed. These scans are of the same type as the sensors produce aboard the UAS or, if simulated, are simulated to be of the same type as the sensors. The scans are also associated with location data 102. In some embodiments, these input sensor data 101 are 360 degree LIDAR images, but it will be appreciated that any appropriate sensor scan known in the art can be used. The untrained neural network 103 is then trained by machine learning module 104 using scans 101 and associated location data 102. Machine learning module 104 determines the proper weights and biases for determining position based on a comparison of input sensor scans 101 to actual sensor scans taken by the UAV as it travels. Machine learning module 104 produces trained neural network 105. Machine learning module 104 can use a number of machine learning techniques, including but not limited to TensorFlow, Theano, Torch, Caffe, CNTK, or CuDNN. In some embodiments, machine learning module 104 establishes the relationship between the images and the corresponding kinematics of the UAS by establishing the proper weights and biases for each LIDAR image and the corresponding kinematics data. The trained neural network 105 is then uploaded onto the UAS before flight.

Figure 2:
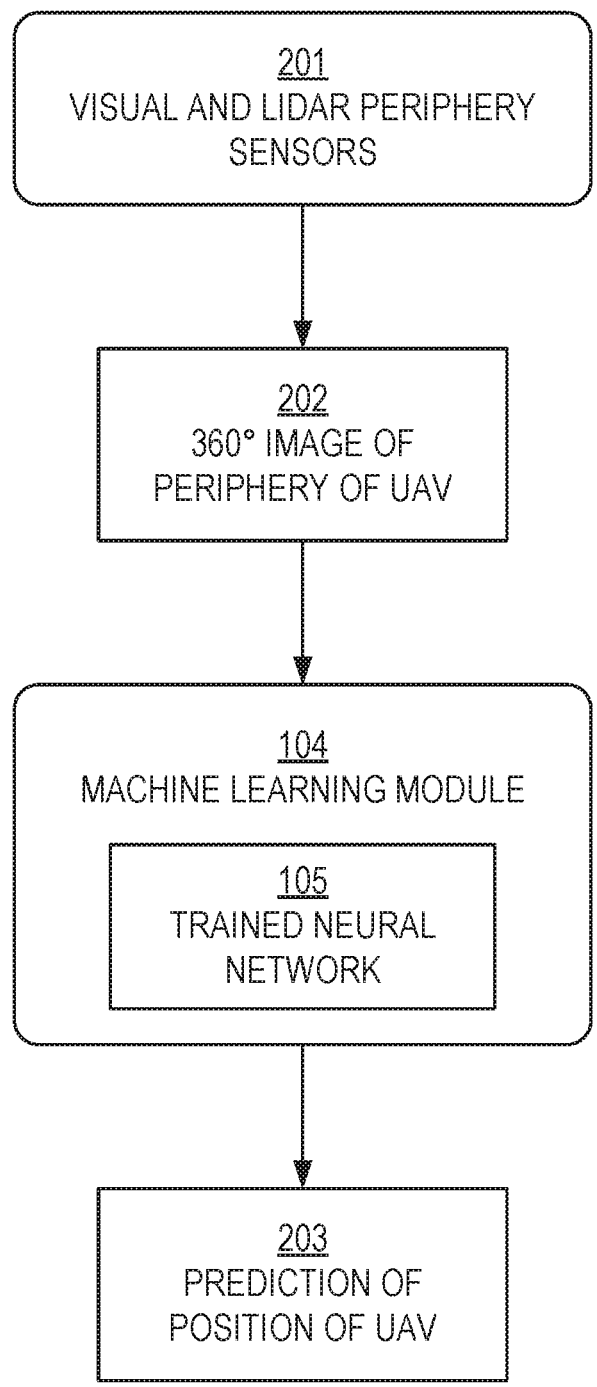
FIG. 2 is a schematic diagram that shows a system for determining position using the neural network and onboard sensors, according to some embodiments.

FIG. 2 is a schematic diagram that shows a system for determining position using the neural network and onboard sensors. In some embodiments, the UAV is equipped with sensors, and an onboard machine learning module 104 for training a neural network, and running trained neural network 105. In some embodiments, the periphery sensors are 360 degree LIDAR sensors, but any appropriate sensors could be used. Various sensors 201 collect data and create a 360 degree image 202 of the periphery of the UAV. Trained neural network 105 then processes this image, using the image to provide a prediction of the position 203 and other kinematics of the UAS based on the weights and biases calculated while training the neural network. In some embodiments, neural network 105 is trained to predict a position by feeding it thousands of image/location pairs and adjusting the weights and biases of the neural network to minimize the error between the neural network's prediction and the locations in the training data set. In some embodiments, neural network 105 is further trained and updated by repeating the feeding and adjusting processes on new image/location pairs. In some embodiments, this prediction 203 is provided to a decision making module, which creates a trajectory for the UAS. Additional embodiments include using additional sensors or another type of sensor 201 for the periphery scans 202. As machine-learning techniques improve, different approaches could be used in the training and machine-learning phases to create better kinematics calculations. In addition, some embodiments allow the neural network to be trained and updated before and during the flight using pre-existing and real-time periphery scans. It will be appreciated that the information collected could be used to determine a variety of kinematics information, such as velocity, acceleration, and orientation, as well as providing information on position.

Figure 3:
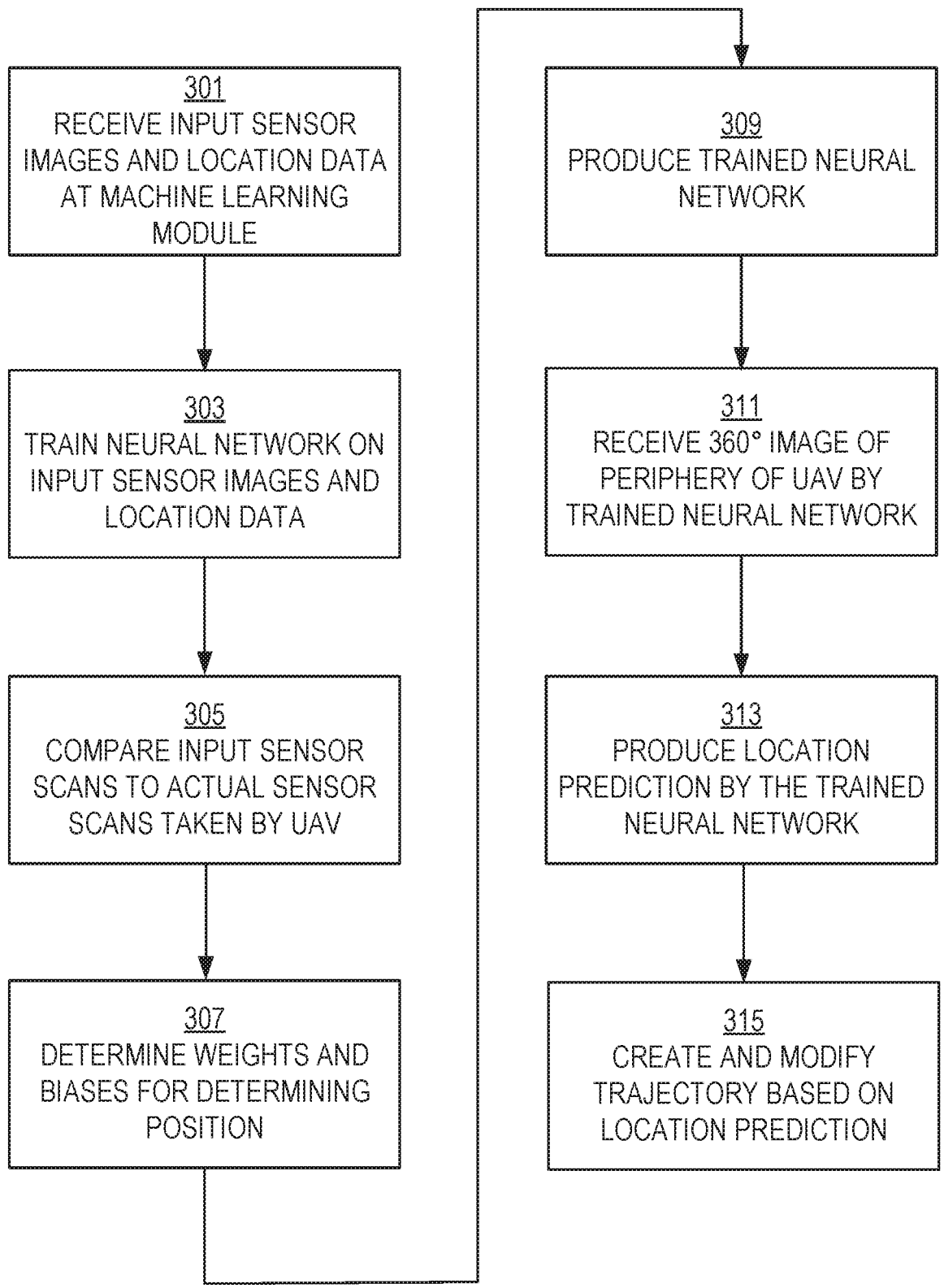
FIG. 3 is a flow diagram that shows a process of determining position using the neural network and onboard sensors, according to some embodiments.

FIG. 3 is a flow diagram that shows a process of determining position using the neural network and onboard sensors, according to some embodiments. At step 301, the machine learning module receives input sensor images and location data. At step 303, the neural network in the machine learning module is trained on input sensor images and location data. At step 305, the input sensor scans are compared to actual sensor scans taken by the UAV on an intended route. At step 307, the machine learning module determines weights and biases based on the comparing. Steps 301 to 307 are repeated as the UAV is flown along the intended flight path until sufficient iterations are completed to train the neural network. At step 309, the machine learning module produces a trained neural network. The trained neural network can be uploaded to another UAV's machine learning module for subsequent flights. At step 311, the trained neural network receives a 360° of the periphery of the UAV. At step 313, the trained neural network produces a location prediction by the trained neural network. At step 315, the prediction is provided to the onboard intelligent trajectory module to create or modify a trajectory for the UAS. This system and method for determining position and kinematics of a UAS is an improvement over previous location-determining systems because it does not rely on GNSS positioning or network connectivity. Thus, the system and method are faster, more reliable, and more efficient than previous systems and methods.

Providing Onboard Wind Prediction

In addition to the neural network providing location information, one or more of the neural networks on the UAS may be dedicated to giving accurate information on wind fields. Strong winds can disturb the motion of the UAS and complicate obstacle avoidance and collision avoidance. Therefore, providing wind predictions may be an important part of any algorithm for trajectory decision-making. As accurate wind field data, GNSS, and network connections are often unavailable in a complex urban environment, a method and system are needed to provide estimates of the wind field onboard the UAS without the need to access these data from a network during flight. In some embodiments, an untrained neural network is trained using sensor imagery of the environs and correlated wind fields. In initial stages, the wind fields are provided via a simulation based around the urban geometry and around known wind fields of the location where the UAS is to operate. In later stages, as actual wind field data become more available, such data can be provided by data from sensors located throughout the city. These sensors could be used to generate more accurate wind predictions, which could then be used to fine tune and further train the neural network. In some embodiments, the sensors are LIDAR sensors, which capture a 360 degree view around the UAS with a 30 degree angle above and below the horizontal, but it will be appreciated that a number of sensor configurations can be used so long as the training input for the neural network can be adjusted to fit the appropriate sensor configuration.

Components of some embodiments of the invention include onboard sensors that can scan the periphery of the UAS to produce imagery of the current surroundings, a machine learning module that take the scan information and produce predictions of the wind field based on prior calculations, and a wind field module to perform the real-time wind field calculations onboard the UAS.

Figure 4:
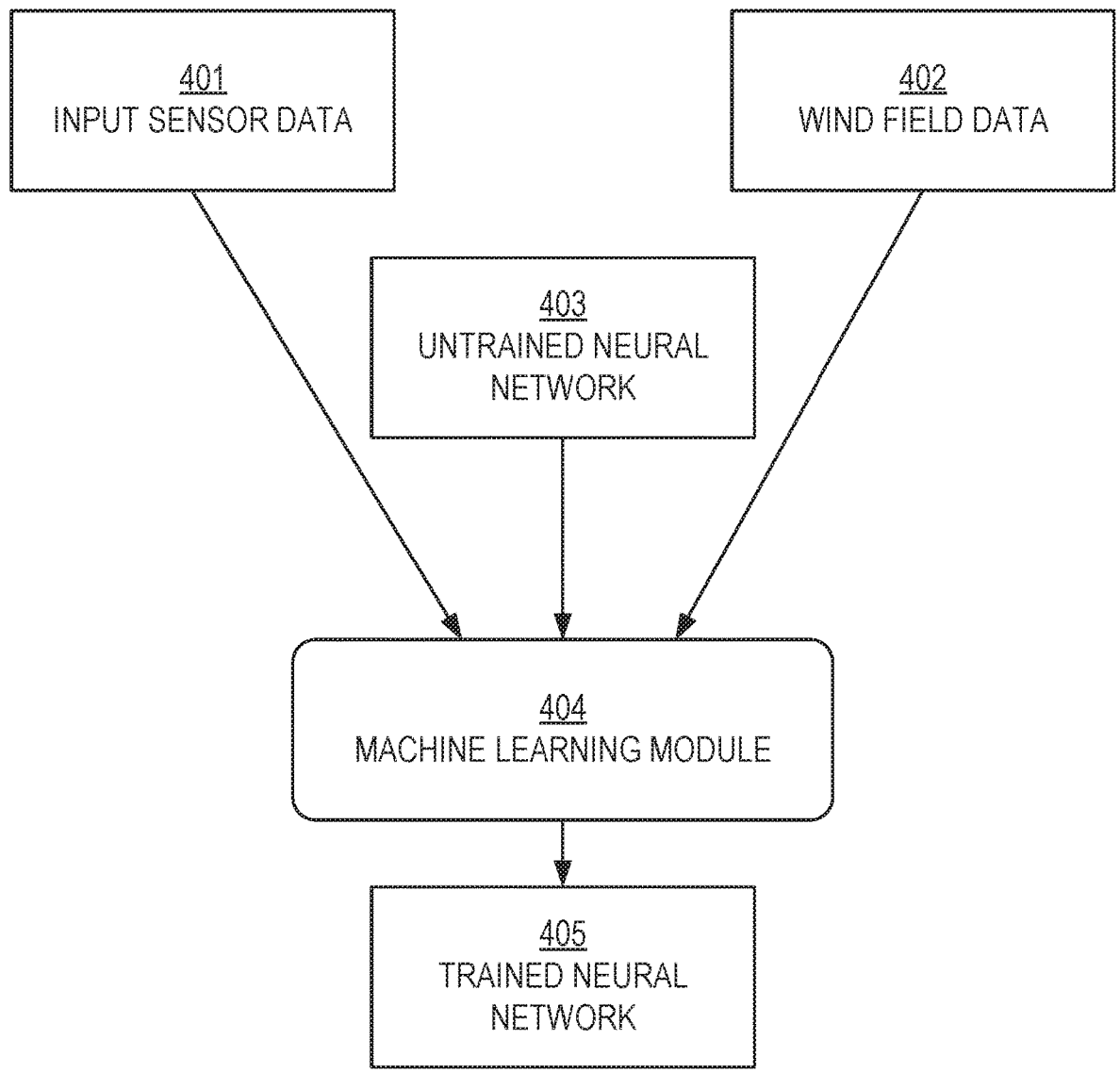
FIG. 4 is a schematic diagram that shows a system for training a neural network with sensor images and wind field data, according to some embodiments.

FIG. 4 is a schematic diagram that shows a system for training a neural network with sensor images and wind field data, according to some embodiments. To provide accurate wind predictions, input sensor images or data 401 are provided to machine learning module 404 for training. These images can be scans that have been collected on a previous journey in the area in which the UAS is to operate, or the scans can be created through the use of an accurate synthetic representation of the urban landscape to be traversed. These scans are of the same type as produced by the sensors aboard the UAS or, if simulated, are simulated to be of the same type as produced by the sensors. In some embodiments, these input sensor data 401 are 360 degree LIDAR images, but it will be appreciated that any appropriate sensor scan known in the art can be used. In addition to the real-time sensor scans, wind field data 402 are provided. These data can be obtained from actual measurements of the winds in the area, or they can be created using a computational fluid dynamics (CFD) model of the area and the associated winds. These wind field data can be in a number of formats, whichever would be most appropriate to the trajectory decision module. For example, in some embodiments the wind field data are presented as a cylindrical cross section of the wind at 50 m from the UAS. In some embodiments, the wind field is presented as a horizontal wind field prediction of the area around the UAS. The proper wind field to be used will depend on the system making the trajectory decisions.

Once the sensor data and wind field data are provided, the neural network 403 is then trained by machine learning module 404. Machine learning module 104 can use a number of effective machine learning techniques, including but not limited to TensorFlow, Theano, Torch, Caffe, CNTK, or CuDNN. In some embodiments, machine learning module 404 establishes the relationship between the images and the corresponding wind field prediction around the UAS by establishing the proper weights and biases for each LIDAR image and each wind field. The trained neural network 405 is then uploaded onto the UAS before flight.

Figure 5:
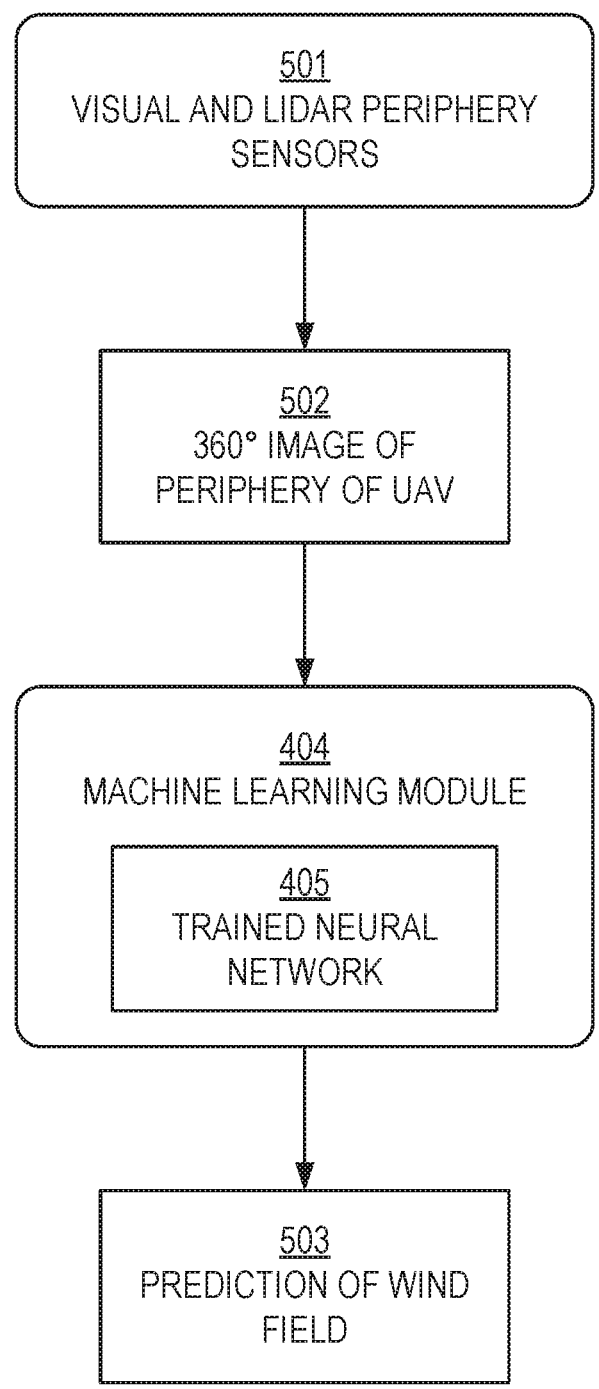
FIG. 5 is a schematic diagram that shows a system for predicting wind field data using the neural network and onboard sensors, according to some embodiments.

FIG. 5 is a schematic diagram that shows a system for predicting wind field data using the neural network and onboard sensors, according to some embodiments. The UAS is equipped with sensors and onboard machine learning algorithms. In an illustrative embodiment, the periphery sensors are 360 degree LIDAR sensors, but any appropriate sensors 501 could be used. In the current embodiment these sensors create a 360 degree image 502 of the periphery of the UAS. The trained neural network 405 then processes this image 502, using the image and the weights and biases calculated while training the neural network create a prediction 503 of the likely wind field around the UAS. In some embodiments, this prediction 503 can then be provided to the intelligent trajectory module to determine or modify the trajectory of the UAS. Additional embodiments of the instant invention could include using additional sensors 501 or another type of sensor for the periphery scans. As machine-learning techniques improve, different approaches could be used in the training and machine-learning phases to create better wind field calculations. Furthermore, in some embodiments, a number of neural networks could be uploaded onto the UAS with wind field calculations that are appropriate to different situations, allowing the UAS to upload a measurement before takeoff and choose a neural network containing wind field data most appropriate to the current situation. In some embodiments, the UAS compares winds along the route to a wind forecast, and then chooses the appropriate neural network for existing conditions.

In some embodiments, a single neural network is trained to determine a wind field based on multiple wind directions or multiple wind speeds. The neural network is then trained to create different wind predictions based on the speed of the wind at a given location. The neural network then obtains these data to create more accurate wind field predictions, or the UAV could be equipped with communication devices to receive broadcasts of wind speed from a set of established local measurement devices. These data could be constantly used to refine and improve the wind field calculations.

It will be appreciated that wind field calculations could also be used in other situations besides the guidance of a UAS. Wind field predictions could be used for emergency responders in cases of airborne hazards such as smoke, ash, or toxic plumes. Wind field predictions based on neural networks could be used for calculations onboard ships, and for precision parachute airdrops, as well as wind predictions at urban airports, and improved wind predictions in mountain valleys, canyons, and indoors.

It will also be appreciated that while certain illustrative embodiments of the invention focus on predicting the wind field, as it is an important part of helping a UAS safely fly, the same approach may be used to make predictions of temperature, pressure, or other atmospheric quantities to improve the safety of the UAS and provide additional information to the program deciding the trajectory of the UAS. Temperature and pressure variations can affect the system, especially when altitude measurements are concerned. In making such estimates, a neural network may be trained to establish the proper weights and biases for location and temperature and/or pressure, presumably given certain starting conditions, then the neural network may be loaded on the UAS and used to make predictions of likely pressure and temperature, which may be used by the trajectory program to augment its calculation of a proper trajectory.

Applications

Multiple shopping and delivery companies have expressed interest in the delivery of packages by UAS aircraft, including Amazon.com, Google, DHL, FedEx, USPS, and UPS. Present embodiments would improve the safety of flight for package delivery, surveillance, and observation tasks, especially in complex environments. The system would be valuable to urban planners, architects, and civil engineers who need to make estimates of urban wind fields for pedestrian comfort and safety, understanding winds and pressure loadings on buildings, and airborne pollution dispersal. The system would also be valuable to urban first responders, such as firefighters, police officers, and public safety officials, in predicting local wind fields with respect to dispersal of ash, sparks, smoke, toxic gas plumes, and the like.

Principles described herein can also be easily extended to provide in-flight prediction of safe landing zones for helicopters and V/STOL operations, both on land and on ships at sea. These principles can also be used for predictions of forward and reverse bullet trajectories.

In an illustrative embodiment of the invention, a method for providing real-time trajectory input to an unmanned aerial system comprises:
- training a first neural network with pre-existing landscape data in a selected flight area with an appropriate location associated with the landscape data;
- training a second neural network with pre-existing landscape data in the selected flight area with pre-existing wind prediction data for the selected flight area;
- uploading the first trained neural network and the second trained neural network to at least one computer onboard the unmanned aerial system;
- flying the unmanned aerial system;
- scanning the peripheral environment around the unmanned aerial system to produce imagery of the unmanned aerial system's current surroundings;
- calculating actual positions of the unmanned aerial system using the first trained neural network and the scanned imagery;
- calculating the predicted wind vectors using the second trained neural network and the scanned imagery; and
- providing the predicted wind vectors and actual position and kinematics information to a trajectory calculator.

Illustratively, the pre-existing landscape data may comprise a synthetic representation of the landscape, scanned images from a previous flight of the unmanned aerial system, or a combination thereof. Similarly, the pre-existing wind prediction data may comprise computer simulation data, calculations from a previous flight of the unmanned aerial system, or a combination thereof. Further, scanning the peripheral environment around the unmanned aerial system may be performed with a camera or LIDAR onboard the unmanned aerial system. Still further, the trajectory calculator may be a computer program or a neural network.

By way of further illustration, the method may further comprise:
- training at least a third neural network to associate pre-existing landscape data in the selected flight area of the unmanned aerial system with pre-existing wind prediction data for the selected flight area of the unmanned aerial system, wherein the second and at least third neural networks are associated with specific weather conditions; and
- checking a weather forecast before takeoff, allowing the unmanned aerial system to select from the second and at least third neural networks to calculate a wind prediction given the weather forecast.

The unmanned aerial system can also communicate with established wind sensors throughout the flight to update which neural network is being used for wind predictions.

The first neural network can be trained in-flight using past sensor data and location data collected by the unmanned aerial system. The second neural network may be trained using multiple wind directions, and the unmanned aerial system may be equipped with an apparatus for determining its orientation with respect to the oncoming winds. These data may also be inferred by the neural network from pre-flight weather forecasts. Further, the second neural network may be trained using multiple wind speeds, and the trained neural network receives data on the current wind speed to create a prediction of the wind field based on wind speed and urban geometry.

Another illustrative embodiment of the invention comprises a system for providing real-time trajectory input to an unmanned aerial system, the system comprising: a trajectory calculator;
   a computer disposed on the unmanned aerial system, the computer comprising a processor and a memory;
   at least one sensor disposed on the unmanned aerial system and configured for scanning the peripheral environment around the unmanned aerial system to produce imagery of the unmanned aerial system's surroundings;
   a first neural network trained with pre-existing landscape data in a selected flight area with an appropriate location associated with the landscape data, the first neural network stored in the memory;
   a second neural network trained with pre-existing landscape data in the selected flight area with pre-existing wind prediction data for the selected flight area, the second neural network stored in the memory;
   computer-readable instructions stored in the memory that, when executed by the processor when the unmanned aerial system is in flight, cause the processor to:
      scan the peripheral environment around the unmanned aerial system to produce imagery of the unmanned aerial system's current surroundings;
      calculate actual positions of the unmanned aerial system using the first trained neural network and the scanned imagery;
      calculate the predicted wind vectors using the second trained neural network and the scanned imagery; and
      provide the predicted wind vectors and actual position to the trajectory calculator.

Illustratively, the pre-existing landscape data may comprise a synthetic representation of the landscape, scanned images from a previous flight of the unmanned aerial system, or a combination thereof. Similarly, the pre-existing wind prediction data may comprise computer simulation data, calculations from a previous flight of the unmanned aerial system, or a combination thereof. Further, scanning the peripheral environment around the unmanned aerial system may be performed with a camera or LIDAR onboard the unmanned aerial system. Still further, the trajectory calculator may be a computer program or a neural network.

By way of further illustration, the method may further comprise:
   training at least a third neural network to associate pre-existing landscape data in the selected flight area of the unmanned aerial system with pre-existing wind prediction data for the selected flight area of the unmanned aerial system, wherein the second and at least third neural networks are associated with specific weather conditions; and
   checking a weather forecast before takeoff, allowing the unmanned aerial system to select from the second and at least third neural networks to calculate a wind prediction given the weather forecast.

The unmanned aerial system can also communicate with established wind sensors throughout the flight to update which neural network is being used for wind predictions.

The first neural network can be trained in-flight using past sensor data and location data collected by the unmanned aerial system. The second neural network may be trained using multiple wind directions, and the unmanned aerial system may be equipped with an apparatus for determining its orientation with respect to the oncoming winds. Further, the second neural network may be trained using multiple wind speeds, and the trained neural network receives data on the current wind speed to create a prediction of the wind field based on wind speed and urban geometry.

Still another illustrative embodiment of the invention comprises a method for providing location data in real-time to an unmanned aerial system, the method comprising:
   training a first neural network with pre-existing landscape data in a selected flight area with an appropriate location associated with the landscape data;
   uploading the first trained neural network to at least one computer onboard the unmanned aerial system;
   flying the unmanned aerial system;
   scanning the peripheral environment around the unmanned aerial system to produce imagery of the unmanned aerial system's current surroundings;
   calculating actual positions of the unmanned aerial system using the first trained neural network and the scanned imagery;
   providing the actual positions to the at least one computer.

This illustrative embodiment may further comprise:
   training a second neural network with pre-existing landscape data in the selected flight area with pre-existing wind prediction data for the selected flight area;
   uploading the second trained neural network to at least one computer onboard the unmanned aerial system; and
   calculating the predicted wind vectors using the second trained neural network and the scanned imagery.

Yet another illustrative embodiment of the invention comprises a method for providing wind vectors to an unmanned aerial system, the method comprising:
   training a second neural network with pre-existing landscape data in the selected flight area with pre-existing wind prediction data for the selected flight area;
   uploading the second trained neural network to at least one computer onboard the unmanned aerial system;
   flying the unmanned aerial system;
   scanning the peripheral environment around the unmanned aerial system to produce imagery of the unmanned aerial system's current surroundings;
   calculating the predicted wind vectors using the second trained neural network and the scanned imagery; and
   providing the predicted wind vectors and actual position to a trajectory calculator.

This illustrative embodiment may further comprise:
   training a first neural network with pre-existing landscape data in a selected flight area with an appropriate location associated with the landscape data;
   uploading the first trained neural network to at least one computer onboard the unmanned aerial system; and
   calculating actual positions of the unmanned aerial system using the first trained neural network and the scanned imagery.

A still further illustrative embodiment of the invention comprises a method of using a neural network for performing real-time wind predictions for unmanned aerial systems operating in dynamic environments, the method comprising:
   training a neural network with pre-existing wind prediction data;
   uploading the neural network data to a computer onboard an unmanned aerial system; flying the unmanned aerial system;

scanning the peripheral environment around the unmanned aerial system to produce imagery of the unmanned aerial system's current surroundings;

calculating wind vectors using the scanned imagery, wherein the calculated wind vectors are determined without the use of GNSS, cellular data, WiFi, or other external network communication; and training the neural network with the calculated wind vectors.

The pre-existing wind prediction data may be obtained from a computer simulation, a previous flight of an unmanned aerial system, or a combination thereof. Scanning the peripheral environment around the unmanned aerial system may be performed with a camera, LIDAR, or both onboard the unmanned aerial system.

Still another illustrative embodiment of the invention comprises a method of using a neural network for determining the position of an unmanned aerial system operating in a dynamic environment, the method comprising:

training a neural network with pre-existing landscape data along an intended flight route of the unmanned aerial system;

uploading the neural network pre-existing landscape data to a computer onboard the unmanned aerial system;

flying the unmanned aerial system along the intended flight route;

scanning a peripheral environment around the unmanned aerial system to produce imagery of the unmanned aerial system's current surroundings;

calculating actual positions of the unmanned aerial system using the scanned imagery and the pre-existing landscape data, wherein the calculated actual positions are determined without the use of GNSS, cellular data, WiFi, or other external network communication; and correcting the position of the unmanned aerial system when the calculated actual position is not along the intended flight route.

The pre-existing landscape data may include a synthetic representation of the landscape, scanned images from previous flights of an unmanned aerial system, or a combination thereof. Scanning the peripheral environment around the unmanned aerial system may be performed with a camera, LIDAR, or both onboard the unmanned aerial system.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. An improved method for determining real-time trajectory for an unmanned aerial system, the method comprising:

training a first neural network, said training including providing a machine learning module with pre-existing landscape data in a selected flight area with location data associated with the landscape data to train the first neural network;

training a second neural network, said training including providing the machine learning module with the pre-existing landscape data in the selected flight area with pre-existing wind prediction data for the selected flight area to train the second neural network;

uploading the first neural network and the second neural network to at least one computer on board the unmanned aerial system;

while being flown along an intended route, scanning, by a sensor on board the unmanned aerial system, a peripheral environment around the unmanned aerial system to produce imagery of the unmanned aerial system's current surroundings;

determining, by the at least one on board computer, actual positions of the unmanned aerial system using the first trained neural network and the imagery;

determining, by the at least one on board computer, predicted wind vectors using the second trained neural network and the imagery; and providing the predicted wind vectors and actual position to a trajectory module to create or modify the trajectory of the unmanned aerial system.

2. The method of claim 1, wherein the pre-existing landscape data include a synthetic representation of the landscape.

3. The method of claim 1, wherein the pre-existing landscape data include scanned images from a previous flight of the unmanned aerial system.

4. The method of claim 1, wherein the pre-existing wind prediction data are from a computer simulation.

5. The method of claim 1, wherein the pre-existing wind prediction data are from calculations from a previous flight of the unmanned aerial system.

6. The method of claim 1, wherein scanning the peripheral environment around the unmanned aerial system is performed with a camera onboard the unmanned aerial system.

7. The method of claim 1, wherein scanning the peripheral environment around the unmanned aerial system is performed with LIDAR onboard the unmanned aerial system.

8. The method of claim 1, wherein the trajectory module is a neural network.

9. The method of claim 1, further comprising:

training at least a third neural network, said training including providing the machine learning module with the pre-existing landscape data in the selected flight area of the unmanned aerial system and the pre-existing wind prediction data for the selected flight area of the unmanned aerial system, wherein the second and at least third neural networks are associated with specific weather conditions; and checking a weather forecast before takeoff, allowing the unmanned aerial system to select from the second and at least third neural networks to calculate a wind prediction given the weather forecast.

10. The method of claim 9, wherein the unmanned aerial system is configured to communicate with established wind sensors throughout the flight to update which neural network is being used for wind predictions.

11. The method of claim 1, wherein the first neural network is trained in-flight using past sensor data and location data collected by the unmanned aerial system.

12. The method of claim 1, wherein the second neural network is trained using multiple wind directions, and the unmanned aerial system is configured for determining its orientation with respect to oncoming winds.

13. The method of claim 1, wherein the second neural network is trained using multiple wind speeds, and the second neural network receives data on current wind speed to create a prediction of wind field based on wind speed and urban geometry.

14. A system for providing real-time trajectory input to an unmanned aerial system, the system comprising:
   a trajectory module;
   a computer disposed on the unmanned aerial system, the computer comprising a processor and a memory;
   at least one sensor disposed on the unmanned aerial system and configured for scanning a peripheral environment around the unmanned aerial system to produce imagery of the unmanned aerial system's current surroundings;
   a first neural network trained with pre-existing landscape data in a selected flight area with location data associated with the landscape data, the first neural network stored in the memory;
   a second neural network trained with the pre-existing landscape data in the selected flight area with pre-existing wind prediction data for the selected flight area, the second neural network stored in the memory;
   computer-readable instructions stored in the memory that, when executed by the processor when the unmanned aerial system is in flight, cause the processor to:
     scan the peripheral environment around the unmanned aerial system to produce the imagery of the unmanned aerial system's current surroundings;
     determine actual positions of the unmanned aerial system using the first trained neural network and the imagery;
     determine the predicted wind vectors using the second trained neural network and the imagery; and
     provide the predicted wind vectors and actual position to the trajectory module to create or modify the trajectory of the unmanned aerial system.

15. The system of claim 14, wherein the trajectory module is a neural network.

16. The system of claim 14, wherein scanning the peripheral environment around the unmanned aerial system is performed with a camera onboard the unmanned aerial system.

17. The system of claim 14, wherein scanning the peripheral environment around the unmanned aerial system is performed with LIDAR onboard the unmanned aerial system.

18. The system of claim 14, wherein the pre-existing landscape data include a synthetic representation of the landscape, scanned images from a previous flight of the unmanned aerial system, or a combination thereof.

19. The system of claim 14, wherein the pre-existing wind prediction data are from a computer simulation, a previous flight of the unmanned aerial system, or a combination thereof.

* * * * *